Aug. 20, 1940.                W. J. MORRILL ET AL                2,212,401
                              DYNAMOELECTRIC MACHINE
                               Filed May 20, 1938
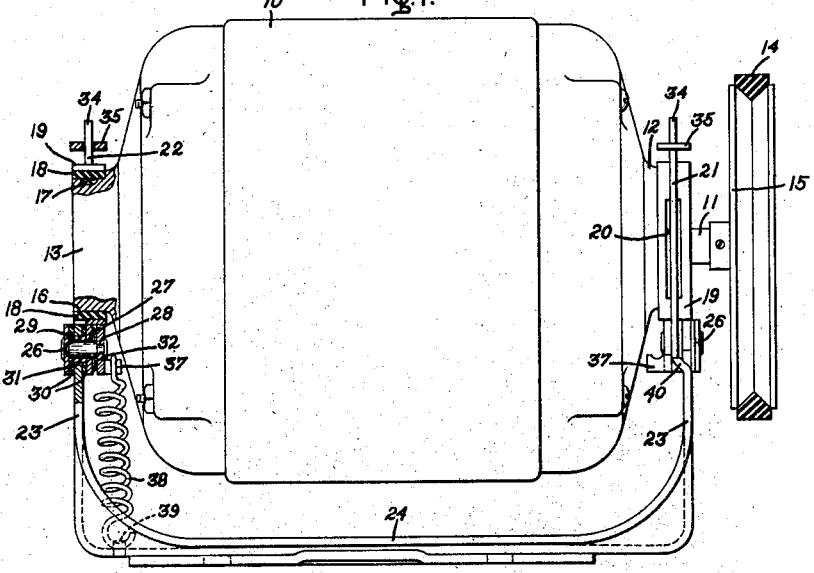
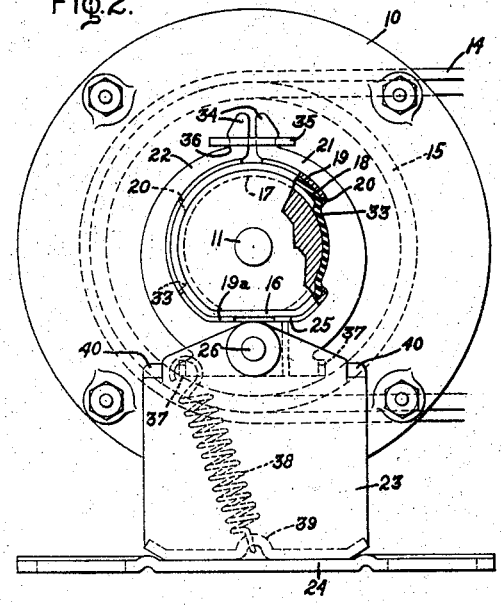
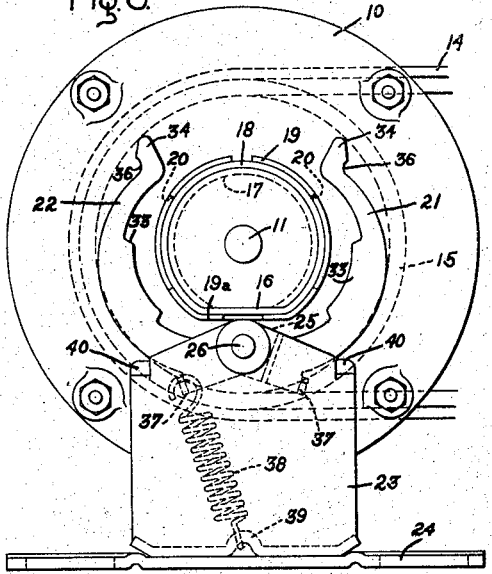
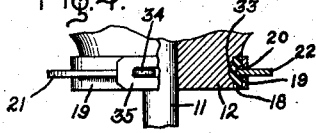
Inventors:
Wayne J. Morrill,
Edwin L. Horning,
by Harry C. Dunham
Their Attorney.

Patented Aug. 20, 1940

2,212,401

UNITED STATES PATENT OFFICE 2,212,401

DYNAMOELECTRIC MACHINE

Wayne J. Morrill and Edwin L. Horning, Fort Wayne, Ind., assignors to General Electric Company, a corporation of New York Application May 20, 1938, Serial No. 209,048

8 Claims. (Cl. 248—23)

Our invention relates to dynamoelectric machines and more particularly to mountings for such machines.

An object of our invention is to provide a dynamoelectric machine or the like with a frictional driving connection having an improved arrangement for regulating the friction in the driving connection.

Another object of our invention is to provide an improved mounting base for a dynamoelectric machine or the like.

Further objects and advantages of our invention will become apparent and our invention will be better understood from the following description referring to the accompanying drawing, and the features of novelty which characterize our invention will be pointed out with particularity in the claims annexed to and forming part of this specification.

For a better understanding of our invention, reference is made to the accompanying drawing wherein Fig. 1 is a side elevation, partly in section, of a dynamoelectric machine provided with a mounting embodying my invention; Fig. 2 is an end elevation, partly in section, of the support and motor illustrated in Fig. 1 viewed from the end opposite the pulley; Fig. 3 is an end view of the arrangement shown in Fig. 2 with the clamping arms of the mounting base in the unclamped position; and Fig. 4 is a plan view, partly broken away, of an end of the dynamoelectric machine hub and clamping ring support.

Referring to the drawing, we have shown a dynamoelectric machine having a stationary member 10 and a rotatable member mounted therein on a shaft 11, the ends of which are journaled in axially extending projections or hubs 12 and 13 formed on the stationary member. Power is transmitted from the dynamoelectric machine to a driven machine through a flexible frictional driving connection comprising a V-belt 14 which engages a V-groove pulley 15 mounted on the shaft 11.

In order to provide the desired starting and running friction in the driving connection, the stationary member 10 of the dynamoelectric machine is supported so as to move pivotally about an axis eccentric with respect to the axial center line of the rotatable member and the shaft 11. The hubs 12 and 13 of the stationary member are formed with a non-circular outer periphery, which is circular except for a portion formed as a straight side 16 on the lower outer surface thereof, and are provided with circumferentially extending grooves 17 on the outer surfaces thereof, which extend completely around the circular portion of the hubs. Two resilient supporting elements or annuluses 18, which are made of resilient rubber or the like, are arranged about the hubs to support resiliently the machine. Split metal bands 19, formed with circumferentially extending slots 20 in each side thereof, are arranged about the outer surface of the resilient annuluses 18 and are provided with a straight portion 19a corresponding to the straight sides 16 of the hubs to provide non-circular bands corresponding to the non-circular outer surface of the hubs.

This mounting assembly is supported at each end of the machine by a pair of clamping arms 21 and 22 on upwardly extending supporting arms 23 of a U-shaped mounting base 24. These clamping arms are formed with a non-circular inner edge having a circular portion and a substantially straight portion 25 on the lower inner edge thereof corresponding to the straight portion 19a of the metal bands 19. In order to support pivotally the dynamoelectric machine on the mounting base 24, the clamping arms 21 and 22 are pivotally secured at the lower ends thereof by pivot pins 26 to the upwardly extending supporting arms 23 of the mounting base. The center line of these pivot pins 26 is the pivotal axis about which the stationary member of the dynamoelectric machine is pivotally supported on the mounting base eccentrically with respect to the axis of the rotor shaft, and in the illustrated arrangement is within the belt loop between the tight lower side of the belt 14 and the longitudinal center line of the rotatable member shaft 11. These pivot pins 26 extend through openings 27 and 28 in the clamping arms 21 and 22, respectively providing for independent pivotal movement of each arm as can be seen from Fig. 3, and these pins 26 are supported in sleeve bearings 29 fitted between washers 30 and retained in openings 31 formed in the upright supporting arms 23 of the mounting base. In order to prevent end play in this pivotal support, a spring washer 32 is arranged between the two clamping arms 21 and 22 about the pivot pin 26. Each of the clamping arms is provided with an inwardly extending arcuate projection 33 formed on the inner edge thereof corresponding to the slots 20 in the metal bands 19. The outer ends of these arms are provided with outwardly extending projections or fingers 34 adapted to be secured together by a locking ring 35, which can be readily slipped over these projections 34 into latching engagement with notches 36 formed on the outer side of the clamping arms adjacent the base of the outwardly extending projections 34.

In order to provide the desired starting friction in the driving connection, the lower ends of the clamping arms are formed with inwardly extending loops 37, adjacent the outer edge thereof and a tension biasing spring 38 is secured to one of the loops 37 on a clamping arm on the closed side of the belt loop and to a punched raised loop 39 formed on the base portion of the mounting base 24. This arrangement of the tension spring 38 biases the clamping arms and the stationary member of the dynamoelectric machine in the direction of the closed side of the driving belt loop and provides the necessary starting friction between the belt 14 and the pulley 15. The biasing spring may be secured to the clamping arm on either side of the hub so as to bias the stationary member of the dynamoelectric machine in either direction depending upon the side of the machine on which the closed side of the belt loop is arranged. The upper corners 40 of each of the supporting arms 23 are punched and bent inwardly to a position axially of the machine corresponding to the axial position of the clamping arms 21 and 22, and form stops for limiting the pivotal movement of the stationary member of the dynamoelectric machine about the pivot pins 26. In this manner if the dynamoelectric machine has pivoted about the pins 26 so that one of the clamping arms 21 or 22 engages one of the projecting corners 40, further pivoting will be prevented and possible damage thereto avoided.

In assembling a dynamoelectric machine on this type mounting base, the clamping arms are opened as shown in Fig. 3, and the hubs 12 and 13 of the dynamoelectric machine stationary member are placed between the clamping arms 21 and 22 with the straight side 16 of the hubs directly above the pivot pins 26. The clamping arms are then closed about the steel bands 19, so that the straight edges 25 of the clamping arms engage the straight sides 19a of the steel bands 19 adjacent the straight sides 16 of the hubs 12 and 13, and thereby secure them and the stationary member of the dynamoelectric machine against rotation relative to the clamping arms. The locking rings 35 are then placed about the projections 34 of the clamping arms and are pressed into the notches 36 so as to secure the clamping arms about the hubs of the stationary member. When the arms are thus securely clamped about the hubs the inwardly extending projections 33 on the arms 21 and 22 extend through the slots 20 in the steel bands 19 into the circumferentially extending grooves 17 in the stationary member hubs, and thereby press against the resilient annuluses 18 and urge them into these grooves. This arrangement is more clearly shown in the broken away portions in Figs. 2 and 4 and secures the stationary member of the dynamoelectric machine against relative axial displacement with respect to the mounting base.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States, is:

1. A dynamoelectric machine or the like having a stationary member and rotatable member, a mounting base, clamping arms adapted to engage a portion of said stationary member, means including a support pivotally engaging one end of each of said clamping arms for pivotally securing each of said clamping arms to said mounting base, and means for securing together the other ends of said clamping arms and for securing said clamping arms to said stationary member to mount pivotally said stationary member on said mounting base.

2. A dynamoelectric machine or the like having a rotatable member and a stationary member provided with a non-circular projection thereon, a mounting base, clamping arms pivotally secured at one end thereof to said mounting base and having a non-circular projection formed thereon adapted to engage said non-circular stationary member projection, and means for securing together the other end of said clamping arms and for securing said clamping arms about said stationary member projection to mount pivotally said stationary member on said mounting base.

3. A dynamoelectric machine or the like having a rotatable member and a stationary member provided with a projection thereon, said stationary member projection being formed with a circumferentially extending groove on the outer periphery thereof, a mounting base, clamping arms having an inwardly extending projection formed thereon, means for pivotally securing one end of said clamping arms to said mounting base, and means for securing together the other ends of said clamping arms and for securing said clamping arms about said stationary member projection to mount pivotally said stationary member on said mounting base, said projections on said clamping arms being adapted to extend into said circumferentially extending groove to secure said stationary member against axial displacement with respect to said mounting base.

4. A dynamoelectric machine or the like having a stationary member and a rotatable member provided with a driving connection, said stationary member having a non-circular projection formed thereon provided with a circumferentially extending groove on the outer periphery thereof, a resilient supporting element arranged about said stationary member projection, a mounting base, clamping arms having a non-circular portion and an inwardly extending projection formed thereon, means for pivotally securing one end of said clamping arms to said mounting base, means for securing together the other ends of said clamping arms and for securing said clamping arms about said resilient supporting element to mount pivotally and resiliently said stationary member on said mounting base, said projections on said clamping arms being adapted to urge said resilient supporting element into said circumferentially extending groove to secure said stationary member against axial displacement, said non-circular portion of said clamping arms being adapted to engage said non-circular portion of said stationary member projection to secure said stationary member against rotation relative to said clamping arms, and means including a spring secured to one of said clamping arms and to said mounting base for initially biasing said dynamoelectric machine stationary member with respect to said driving connection.

5. A mounting base for a dynamoelectric machine or the like having a stationary member with a non-circular projection, non-circular clamping arms pivotally secured to said mounting base, and means for securing said non-circular clamping arms about said non-circular projection of said stationary member to mount pivotally said stationary member on said mounting base.

6. A mounting base for a dynamoelectric machine or the like having a stationary member with a non-circular projection, a resilient supporting element arranged about said non-circular projection, non-circular clamping arms pivotally secured to said mounting base, and means for securing said non-circular clamping arms about said resilient supporting element to mount pivotally and resiliently said stationary member on said mounting base.

7. A mounting base for a dynamoelectric machine or the like having a stationary member provided with a projection formed with a circumferentially extending groove on the outer periphery thereof, a resilient supporting element arranged about said stationary member projection, clamping arms having an inwardly extending projection formed thereon, means for pivotally securing said clamping arms to said mounting base, and means for securing said clamping arms about said resilient supporting element to mount pivotally and resiliently said stationary member on said mounting base, said projections on said clamping arms being arranged to urge said resilient supporting element into said circumferentially extending groove to secure said stationary member against axial displacement.

8. A mounting base for a dynamoelectric machine or the like having a stationary member provided with a projection thereon, said stationary member projection being formed with a circumferentially extending groove on the outer periphery thereof, clamping arms having an inwardly extending projection formed thereon, means for pivotally securing one end of said clamping arms to said mounting base, and means for securing together the other ends of said clamping arms and for securing said clamping arms about said stationary member projection to mount pivotally said stationary member on said mounting base, said projections on said clamping arms being adapted to extend into said circumferentially extending groove to secure said stationary member against axial displacement with respect to said mounting base.

WAYNE J. MORRILL.
EDWIN L. HORNING.